United States Patent [19]

Kobayashi et al.

[11] Patent Number: 5,148,409
[45] Date of Patent: Sep. 15, 1992

[54] ULTRASONIC GROUND SPEEDOMETER UTILIZING DOPPLER EFFECT

[75] Inventors: Hiroshi Kobayashi; Masami Negishi; Toshiya Kimura, all of Kanagawa, Japan

[73] Assignee: Nissan Motor Company, Ltd., Japan

[21] Appl. No.: 755,707

[22] Filed: Sep. 6, 1991

Related U.S. Application Data

[63] Continuation of Ser. No. 513,658, Apr. 24, 1990, Pat. No. 5,097,453.

[30] Foreign Application Priority Data

Apr. 28, 1989 [JP] Japan .................................. 1-107320

[51] Int. Cl.$^5$ .............................................. G01S 15/00
[52] U.S. Cl. ...................................................... 367/91
[58] Field of Search ................................. 367/90, 91

[56] References Cited

U.S. PATENT DOCUMENTS

| | | | |
|---|---|---|---|
| 3,202,960 | 8/1965 | Galbraith | 367/91 |
| 4,728,954 | 3/1988 | Phelan et al. | 367/91 |
| 4,755,975 | 7/1988 | Ito et al. | 367/140 |

Primary Examiner—Daniel T. Pihulic
Attorney, Agent, or Firm—Lowe, Price, LeBlanc & Becker

[57] ABSTRACT

An ultrasonic ground speedometer utilizing Doppler effect comprises an ultrasonic transmitter for outputting an ultrasonic wave at a predetermined angle against a road surface, an ultrasonic receiver for receiving a reflected ultrasonic wave caused by reflection of the output ultrasonic wave from a road surface, an arithmetic circuit for deriving ground speed from Doppler shift between the output ultrasonic wave and the reflected ultrasonic wave. The ultrasonic ground speedometer also includes an output frequency control circuit for controlling the output ultrasonic wave frequency in such a manner as to keep the reflected ultrasonic wave frequency to a constant value in response to changes in ground speed. An amplification degree control circuit is also included for controlling the amplitude of the output ultrasonic wave to keep a substantially constant output intensity of the output ultrasonic wave over an output ultrasonic wave frequency range controlled by the output frequency control circuit.

4 Claims, 4 Drawing Sheets

ULTRASONIC GROUND SPEEDOMETER UTILIZING DOPPLER EFFECT

This application is a continuation of application Ser. No. 07/513,658, filed on Apr. 24, 1990, now U.S. Pat. No. 5,097,453.

BACKGROUND OF THE INVENTION

1. Field of the Invention

The present invention relates to an ultrasonic ground speedometer utilizing Doppler effect which is, for example, adapted for detection of vehicle speed over the ground. Specificaly to a speedometer which is capable of providing high accuracy of ground speed measurement.

2. Description of the prior Disclosure

Recently, there have been developed and proposed various ultrasonic ground speedometers. Such ground speedometers generally include an ultrasonic transmitter for outputting an ultrasonic wave having a predetermined frequency, an ultrasonic receiver for receiving the ultrasonic wave when reflected from the road surface and for generating a reflected ultrasonic wave signal, and an arithmetic circuit for deriving ground speed from a Doppler shift occurring in the output ultrasonic wave due to Doppler effect.

One such ultrasonic ground speedometer has been disclosed in Japanese Patent First Publication (Tokkai) Showa 60-76678.

As is generally known, the aforementioned arithmetic circuit derives the ground speed from the Doppler shift according to the following equation:

$$f_d \approx 2 f_o \cdot v \cos\theta / C$$

wherein $f_d$ is a Doppler frequency or a Doppler shift, $f_o$ is a basic or output frequency of an output ultrasonic wave emitted from the transmitter, v is a vehicle speed, $\theta$ is an emitting angle of the output ultrasonic wave relative to the road surface 5 as shown in FIG. 1, and C is the sound velocity of the output ultrasonic wave. In the aforementioned equation, the Doppler frequency $f_d$ is a plus value when the output ultrasonic wave is obliquely emitted in the vehicle forward direction, while the Doppler shift frequency $f_d$ is a minus value when the output ultrasonic wave is obliquely emitted rearward of the vehicle direction.

As appreciated from the above described equation, if the Doppler frequency $f_d$ is derived, the vehicle speed v will be derived, because other parameters $f_o$, $\theta$ and C are known quantities. The sound velocity C is generally equal to approximately 340 m/sec (1224 km/h) at ordinary atmospheric temperature. While the parameters $f_o$ and $\theta$ are respectively fixed to predetermined constant values, the Doppler shift $f_d$ is proportional to the vehicle speed v.

Assuming that the vehicle has a vehicle speed range of 0 to 200 km/h and the emitting angle $\theta$ is 45°, the Doppler shift $f_d$ may vary from 0 (at a vehicle speed of 0) to approximately 0.23 $f_o$ (at a maximum vehicle speed of 200 km/h). The frequency of the reflected ultrasonic wave signal from the ultrasonic receiver (the received frequency) is represented by the sum between the frequencies $f_o$ and $f_d$. Therefore, assuming that the output frequency $f_o$ of the output ultrasonic wave is 120 kHz, the Doppler shift $f_d$ varies from 0 to a maximum Doppler shift frequency $f_{dmax}$ of 27.6 kHz ($f_{dmax}$=approximately 0.23 $f_o$) and consequently the received ultrasonic wave signal of the ultrasonic receiver varies from 120 kHz to 147.6 kHz (120 kHz+27.6 kHz).

In the aforementioned conventional ultrasonic ground speedometers, an ultrasonic transmitter includes an echo sounder transmitter traditionally consisting of a piezoelectric echo sounding microphone, while an ultrasonic receiver includes an echo sounder receiver also consisting of a piezoelectric echo sounding microphone. As is well known, since in this type of application echo sounding microphones are arranged in a severe environment, such as an underfloor of a vehicle, a sealed type construction is required. Such a sealed type echo sounding microphone has a particular resonance frequency depending on the geometry of its enclosure and as a result the sealed type or resonance type microphone provides the highest sound pressure sensitivity at its resonance frequency. FIG. 3 is an exemplified characteristic curve illustrating the relationship between the sound-pressure sensitivity and the frequency of the ultrasonic wave received by a traditional resonance type microphone having a resonance frequency of 120 kHz. As clearly seen from the graph of FIG. 3, the microphone exhibits a maximum sound-pressure sensitivity of approximately 110 dB at its resonance frequency. However, if the received ultrasonic wave frequency is other than the resonance point of the microphone, the sensitivity of the microphone becomes drastically lowered. That is, a resonance type microphone has a relatively narrow frequency range with regard to high sensitivity. All resonance type microphones display essentially the same tendency as to sound-pressure characteristics as are seen in FIG. 3. As previously described, since the received frequency varies from the output frequency $f_o$ to the sum ($f_o + f_{dmax}$), it is desirable that an echo sounder receiver has high sensitivity over a wide frequency range as described previously. The received frequency ($f_o + f_{dmax}$) is representative of a maximum received frequency if the maximum Doppler shift $f_{dmax}$ is plus, while the received frequency ($f_o + f_{dmax}$) is representative of a minimum received frequency if the maximum Doppler shift $f_{dmax}$ is minus. On the contrary, as appreciated from FIG. 3, since resonance type microphones generally exhibit a relatively narrow frequency characteristic with regard to high sensitivity, high sensitivity coverage over a wide frequency range, of $f_o$ to ($f_o + f_{dmax}$), cannot be satisfied. Therefore, even if the output frequency $f_o$ the transmitter is set to a value suitable to the sensitivity characteristic of a resonance type microphone serving as the ultrasonic receiver, a sufficient S/N (signal-to-noise) ratio of the received frequency signal or the Doppler shift signal cannot be obtained within a wide frequency range, exhibiting low sensitivity, but can be obtained only within the particular narrow frequency range close to the resonance frequency of the microphone.

The aforementioned problem of resonance type microphones will be hereinbelow detailed according to the frequency/sensitivity characteristic curves of FIGS. 4 and 5.

FIG. 4 is a frequency/sensitivity characteristic curve of a resonance type microphone having a resonance frequency of approximately 134 kHz.

Referring now to FIG. 4, the output frequency $f_o$ is set to a particular value such that the resonance frequency of the ultrasonic receiver becomes a middle value of $f_o + f_{dmax}/2$ between the output frequency $f_o$ and the maximum or minimum received frequency ($f_o + f_{dmax}$) so as to provide a relatively high sound-pressure sensitivity over the widest possible frequency range. Assuming that a maximum vehicle speed and an emitting angle of the output ultrasonic wave are respectively set to 200 km/h and 45°, the output frequency $f_o$ may be selected at a particular frequency of for example 120 kHz to satisfy the above mentioned condition. In this manner, if the output frequency $f_o$ is fixed to 120 kHz, the received frequency of the ultrasonic receiver varies within a frequency range of 120 kHz (at a vehicle speed of 0) to 147.6 kHz (at a maximum vehicle speed of 200 km/h). The resonance type microphone therefore exhibits the highest sensitivity, approximately 107 dB (at a middle vehicle speed of 100 km/h), at its resonance frequency, which is set to an essentially middle value between the output frequency 120 kHz and the maximum received frequency 147.6 kHz (corresponding to the sum of the output frequency $f_o$ and the maximum Doppler shift $f_{dmax}$). By selecting an optimum value of the output frequency $f_o$, a possible high sensitivity is obtained for the previously described resonance type microphones. However, even if the output frequency $f_o$ is set to an optimum value depending on the frequency/sensitivity characteristic of the resonance type microphone, the microphone exhibits insufficient low frequency sensitivity (less than 90 dB) at frequency ranges corresponding to the received frequencies at vehicle speeds 0 and 200 km/h.

As set forth above, in resonance type microphones, sufficient sensitivity is not obtained at frequencies other than the resonance frequency, and as a result a sufficient S/N ratio of the reflected ultrasonic wave signal from the ultrasonic receiver or the Doppler shift signal from the arithmetic circuit is not obtained. This results in low accuracy of ground speed measurement.

FIG. 5 shows another type piezoelectric microphone serving as an ultrasonic receiver. This microphone has relatively flat frequency/sensitivity characteristics. As will be appreciated by comparing the frequency/sensitivity characteristic curves shown in FIGS. 4 and 5, the absolute sound-pressure sensitivity of the microphone of FIG. 5 is considerably less than that of FIG. 4 at all frequency ranges. In other words, the microphone shown in FIG. 5 is so designed that frequency/sensitivity characteristics become flat at the sacrifice of absolute sound-pressure sensitivity at its resonance point and in the vicinity of the resonance point. Therefore, such microphones with flat frequency/sensitivity characteristics cannot provide a high enough S/N ratio of received ultrasonic wave signals due to low sensitivity throughout its frequency range.

SUMMARY OF THE INVENTION

It is, therefore in view of the above disadvantages, an object of the present invention to provide an ultrasonic ground speedometer utilizing Doppler effect which has high accuracy of ground speed measurement over a vehicle's entire speed range.

It is another object of the invention to provide an ultrasonic ground speedometer utilizing Doppler effect which can provide a high S/N ratio Doppler frequency signal representative of Doppler shift between an output ultrasonic wave generated from an ultrasonic transmitter and a reflected ultrasonic wave received by an ultrasonic receiver.

In order to accomplish the aforementioned and other objects, an ultrasonic ground speedometer utilizing Doppler effect comprises ultrasonic transmitting means for outputting an ultrasonic wave at a predetermined angle against a road surface, ultrasonic receiving means for receiving a reflected ultrasonic wave caused by reflection of the output ultrasonic wave from the road surface, arithmetic means for deriving ground speed from Doppler shift between the frequencies of the output ultrasonic wave from the ultrasonic transmitting means and the reflected ultrasonic wave received by the ultrasonic receiving means, and means for controlling the output ultrasonic wave frequency in such a manner as to keep the reflected ultrasonic wave frequency represented by the sum of the output ultrasonic wave frequency and the Doppler shift to a constant value in response to change in the ground speed as derived by the arithmetic means.

According to another aspect of the invention, an ultrasonic ground speedometer utilizing Doppler effect comprises ultrasonic transmitting means for outputting an ultrasonic wave at a predetermined angle against a road surface, ultrasonic receiving means for receiving a reflected ultrasonic wave caused by reflection of the output ultrasonic wave from the road surface, arithmetic means for deriving ground speed from Doppler shift between the frequencies of the output ultrasonic wave from the ultrasonic transmitting means and the reflected ultrasonic wave received by the ultrasonic receiving means, means for controlling the output ultrasonic wave frequency in such a manner as to keep the reflected ultrasonic wave frequency, represented by the sum of the output ultrasonic wave frequency and the Doppler shift, to a constant value in response to change in the ground speed as derived by the arithmetic means, and means for controlling the amplitude of the output ultrasonic wave to keep a substantially constant intensity of the output ultrasonic wave over the output ultrasonic wave frequency range controlled by the output frequency controlling means. The ultrasonic transmitting means may include an oscillator for generating an output signal having a frequency within, at least, the output ultrasonic wave frequency range, an echo sounder transmitter for emitting the output ultrasonic wave in response to the oscillator output signal, and a drive circuit for amplifying the oscillator output signal and for driving the echo sounder transmitter via the amplified signal therefrom. The ultrasonic receiving means may include an echo sounder receiver for receiving the reflected ultrasonic wave and for generating a reflected ultrasonic wave signal having the same frequency as the reflected ultrasonic wave. Preferably, the echo sounder transmitter and/or the echo sounder receiver may include a piezoelectric echo sounding microphone(s). The arithmetic means may include a multiplier for deriving the frequency difference between the oscillator output signal frequency and the reflected ultrasonic wave signal frequency by multiplying both of the frequencies, a low-pass filter for filtering undesirable noise from the frequency difference signal generated by the multiplier, a zero-crossing comparator for waveform-shaping the filtered frequency difference signal representative of a Doppler shift signal, a pulse counter for counting pulses in the Doppler shift signal from the comparator and for deriving a Doppler frequency, and an arithmetic circuit serving as a Doppler-frequency/ground-speed convertor.

The amplitude controlling means may include an amplification degree control circuit for controlling the drive circuit in such a manner as to amplify the oscillator output signal to an amplification degree determined on the basis of the frequency/sensitivity characteristic of the echo sounder transmitter, in response to the oscillator output signal frequency being varied by the output frequency controlling means, so as to compensate the intensity (amplitude) of the output ultrasonic wave from the transmitter at low sensitivity frequencies of the transmitter such that the output signal remains within an optimal amplitude range over all output frequencies.

Each of the echo sounder transmitter and the echo sounder receiver may include a resonance type microphone having a high Q factor. The reflected ultrasonic wave frequency may be set in the vicinity of the resonance frequency of the resonance type microphone to insure the highest S/N ratio of the Doppler shift

DESCRIPTION OF THE PREFERRED EMBODIMENT

Figure 1:
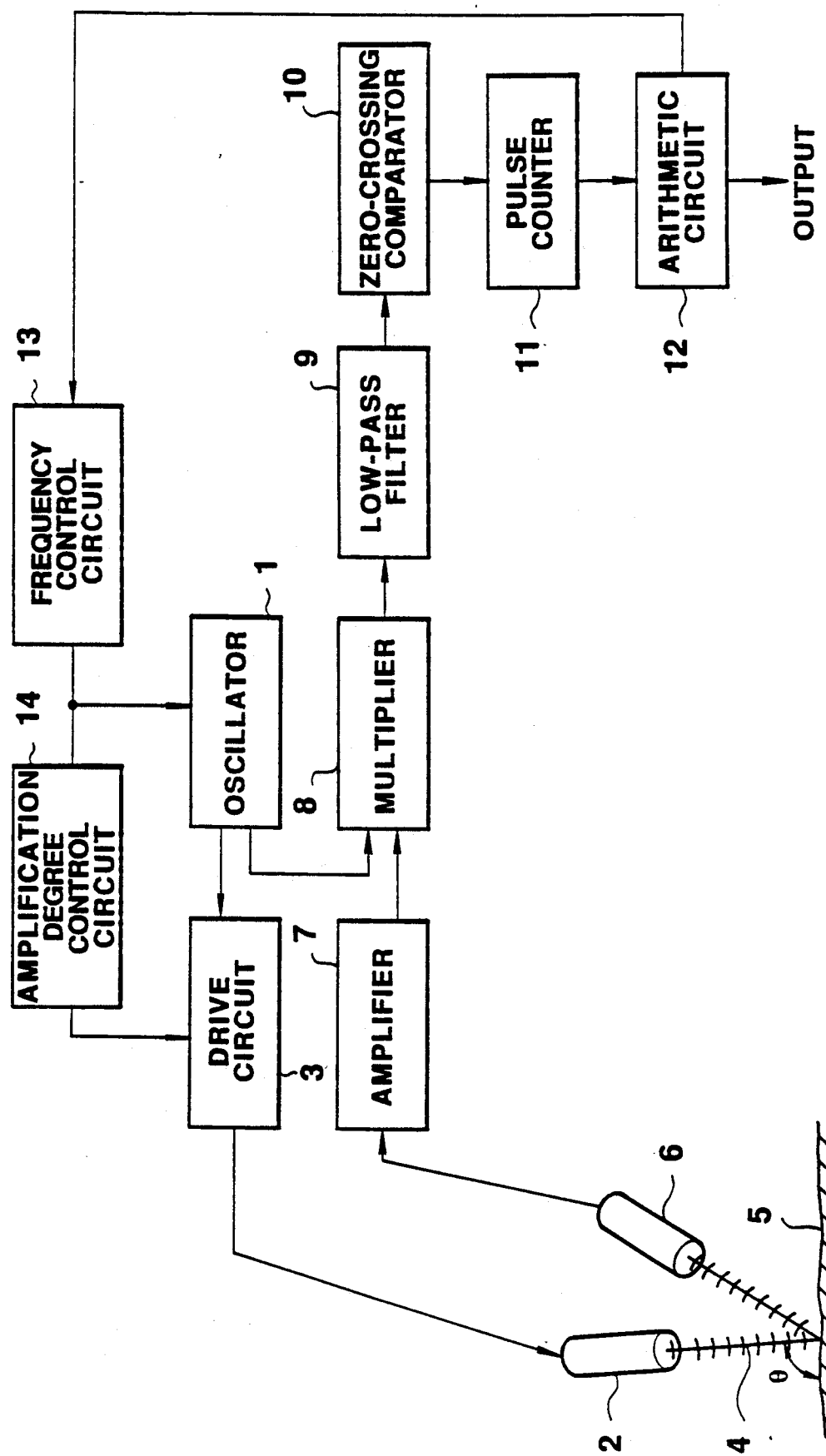
FIG. 1 is a block diagram illustrating an ultrasonic ground speedometer of one embodiment of the invention.

Referring now to FIG. 1, an ultrasonic transmitter for an ultrasonic ground speedometer according to the invention includes an oscillator 1 for generating an output signal having a particular frequency within a predetermined frequency range including 120 kHz, an echo sounder transmitter 2 for transmitting an ultrasonic wave having the particular frequency, and a drive circuit 3 for amplifying the oscillator output signal and for driving the echo sounder transmitter 2 by the amplified signal output therefrom. A piezoelectric echo sounding microphone is commonly used as the transmitter 2. The transmitter 2 emits an ultrasonic wave 4 with the previously described particular frequency against a road surface 5. The ultrasonic ground speedometer of the invention also comprises an ultrasonic receiver including an echo sounder receiver 6 for both receiving a reflected ultrasonic wave caused by reflection of the output ultrasonic wave from the road surface, and for generating a reflected ultrasonic wave signal. An amplifier 7 is also included for amplifying the reflected ultrasonic wave signal. Traditionally, the echo sounder receiver 6 also consists of a piezoelectric echo sounding microphone. Additionally, the ultrasonic ground speedometer of the invention comprises a signal processor including a multiplier 8 for deriving the frequency difference between the oscillator output signal frequency and the reflected ultrasonic wave signal frequency by multiplying both the frequencies, a low-pass filter 9 for filtering undesirable noise from the frequency difference signal generated from the muiltiplier 8, a zero-crossing comparator 10 for wave-shaping the filtered frequency difference signal representative of Doppler shift in such a manner as to convert a sine wave to a square wave, a pulse counter 11 for counting pulses in the Doppler shift signal from the comparator 10 and for deriving a Doppler frequency, and an arithmetic circuit 12 serving as a Doppler-frequency/ground-speed convertor. Such an arithmetic circuit 12 derives the ground speed on the basis of an output signal from the pulse counter, representative of the Doppler frequency, according to the previously described equation ($f_d \approx 2f_o \cdot v \cos \theta/C$). The above described construction of the ultrasonic ground speedometer is similar to the conventional ultrasonic ground speedometer utilizing Doppler effect.

The ultrasonic ground speedometer of the invention also includes a frequency control circuit 13 for receiving the pulse counter output signal representative of the Doppler shift $f_d$ through the arithmetic circuit 12 and for varying the oscillator output frequency $f_o$ in such a manner as to keep the reflected ultrasonic wave signal frequency ($f_o + f_d$) to a substantially constant value, for example 130 kHz. An amplification degree control circuit 14 is also included for controlling the drive circuit 3 in such a manner as to amplify the oscillator output signal to an amplification degree determined on the basis of the frequency/sensitivity characteristic of the transmitter 2. Because the transmitter including a resonance type microphone has a frequency/sensitivity characteristic similar to the microphones shown in FIGS. 3 and 4, the amplitude of the amplified signal from the drive circuit 3 must be varied so as to keep a constant intensity of output from the ultrasonic transmitter 2. If the amplification degree in the drive circuit 3 is fixed to a constant value, the transmitter 2 transmits a relatively high amplitude of output ultrasonic wave when the oscillator output frequency lies in the resonance frequency of the transmitter 2 or in the vicinity of the resonance frequency, while the transmitter 2 transmits a relatively low amplitude of output ultrasonic wave when the oscillator output frequency lies in frequencies other than the resonance frequency and frequencies close to the resonance frequency. Such fluctuation in intensity of the output ultrasonic wave results in fluctuation in intensity of the reflected ultrasonic wave. As a result, a sufficient S/N ratio of the Doppler shift signal is not obtained. To avoid this, the amplification degree control circuit 14 controls the drive circuit 3 in response to the oscillator output frequency varied by the frequency control circuit 13 such that the amplification degree is increased to compensate the intensity (amplitude) of the output ultrasonic wave from the transmitter when transmitting within the low sensitivity frequency range of the transmitter.

Figure 5:
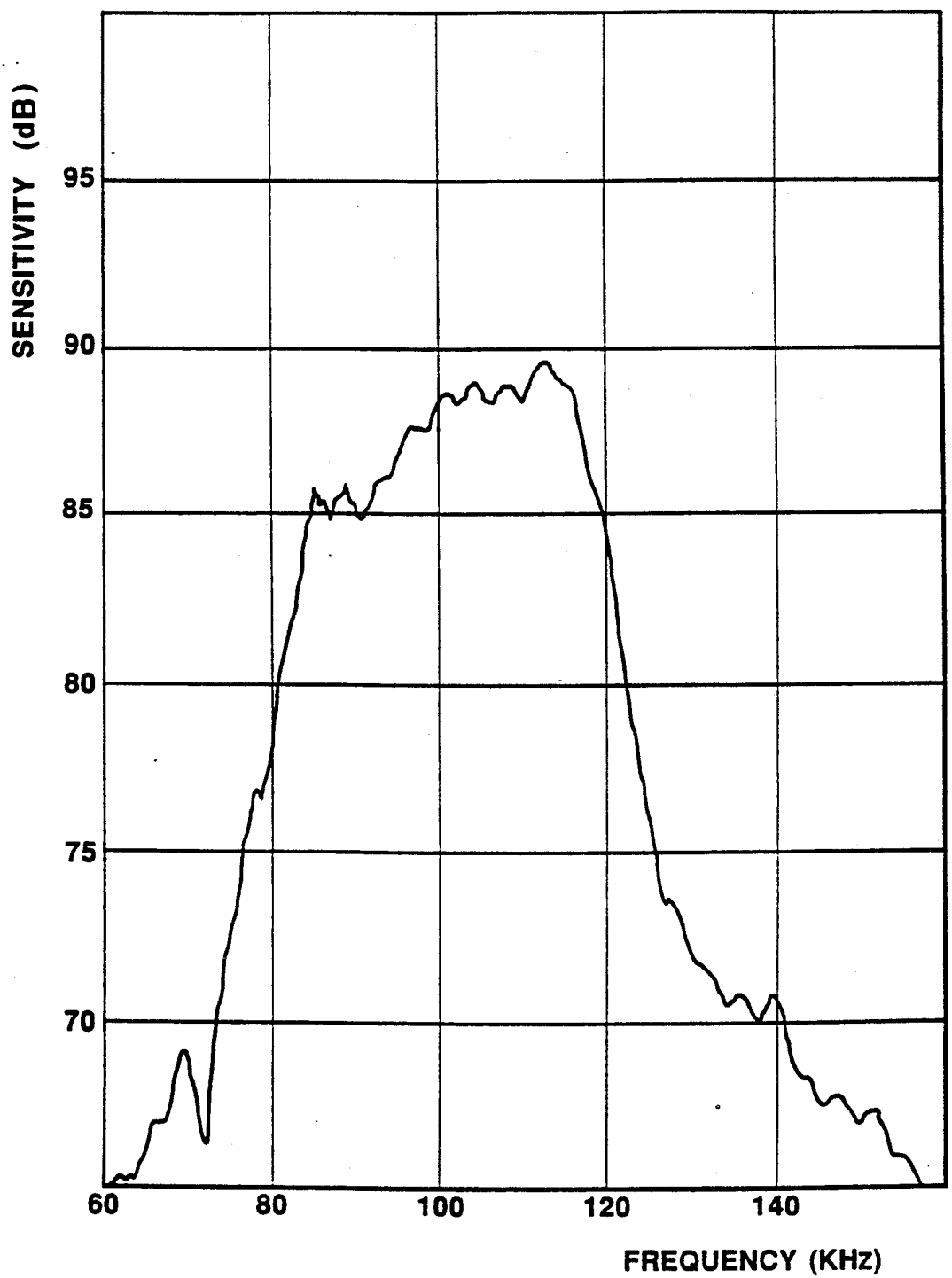

On the other hand, if a microphone having a flat frequency/sensitivity characteristic as shown in FIG. 5 is used as the transmitter 2, the amplification degree control circuit 14 is not required, because such a transmitter has a substantially constant output intensity across the range of oscillator output frequencies. In this case, the amplification degree of the drive circuit 3 may be fixed at a constant value suitable to the sensitivity of the transmitter 2.

Figure 3:
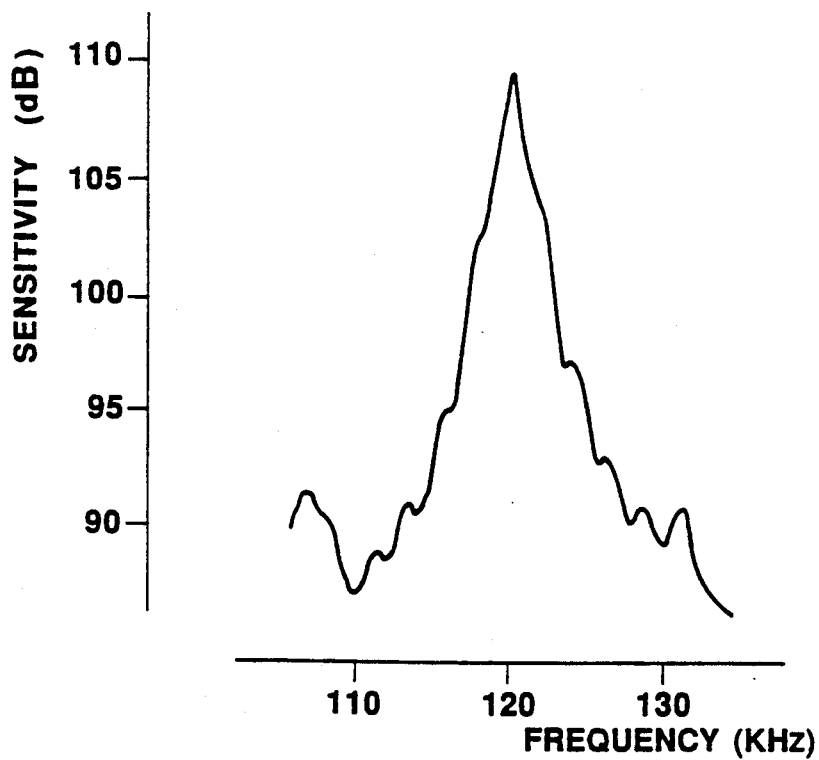
FIGS. 3 through 5 are graphs illustrating the frequency/sensitivity characteristic curves of three piezoelectric echo sounding microphones.
Figure 4:
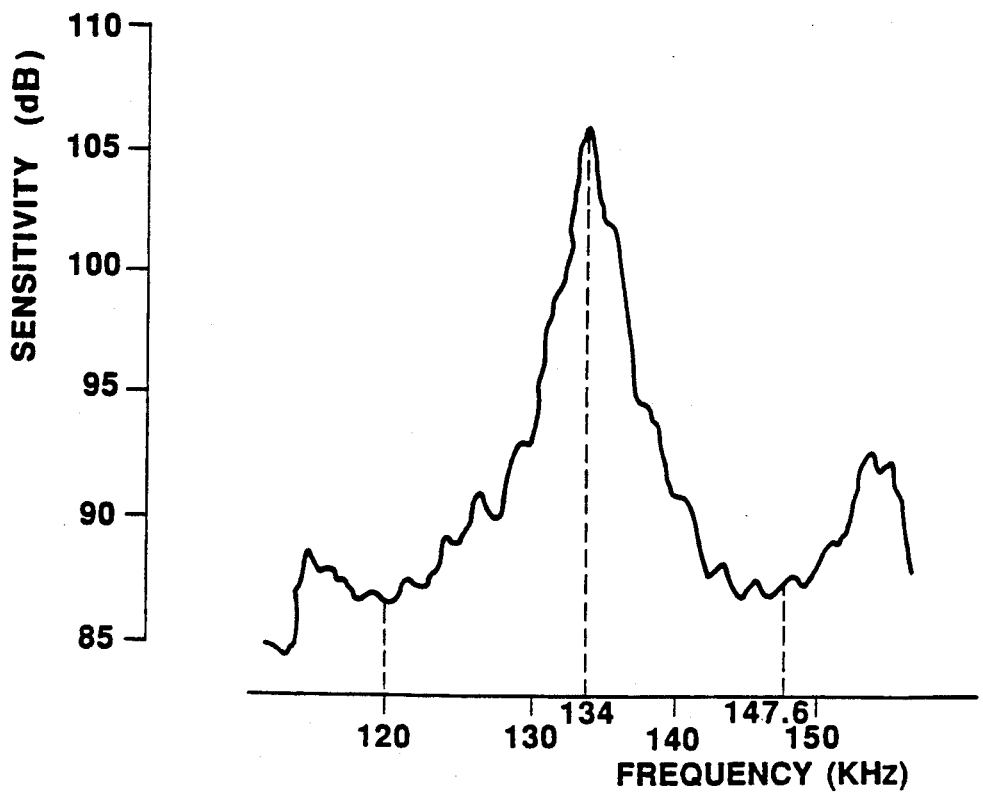

As will be appreciated from the above, the ultrasonic ground speedometer according to the invention controls the output ultrasonic wave frequency $f_o$ (corresponding to the oscillator output frequency) such that the sum ($f_o + f_d$) between the output frequency $f_o$ and the Doppler shift $f_d$, that is the reflected ultrasonic wave frequency is kept to a substantially constant value, for example 130 kHz. This means that the receiver 6 can receive reflected ultrasonic waves having a substantially constant frequency of approximately 130 kHz. If a resonance type microphone having a high Q factor (a high resonance point) as shown in FIGS. 3 and 4 is used as the receiver 6 and its resonance frequency is set to approximately 130 kHz, the receiver may constantly generate a high level reflected ultrasonic wave signal, irrespective of vehicle speed Furthermore, when such a resonance type microphone having a high Q factor is used as the receiver 6, the resonance type microphone functions as an acoustic filter for filtering out undesirable frequency components in the reflected ultrasonic wave due to the frequency directivity thereof. This results in a higher S/N ratio for the Doppler shift signal.

As previously described, although the oscillator output frequency is varied in such a manner as to keep the reflected ultrasonic wave signal frequency at a substantially constant value, it is desirable that the oscillator output frequency range is set in the vicinity of a particular frequency, for example 120 kHz to provide the highest S/N ratio for the Doppler shift signal, if the ultrasonic ground speedometer is to be utilized on standard rough and smooth driving surfaces. The particular frequency of 120 kHz was experimentally assured by the inventors of the present invention.

Figure 2:
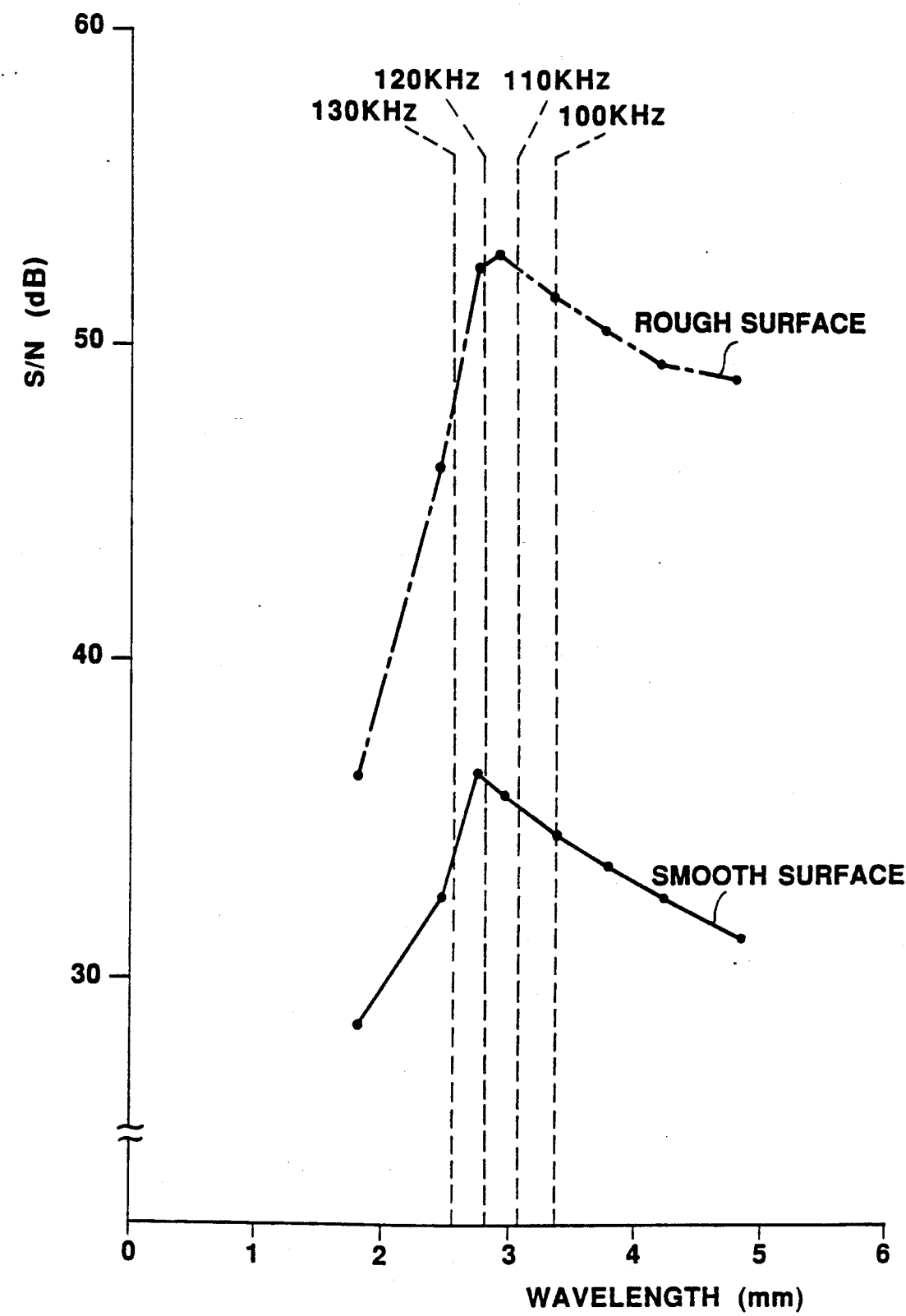
FIG. 2 is a graph illustrating the relationship between the S/N ratio of a Doppler frequency signal and the ultrasonic wavelength.

FIG. 2 is a graph illustrating ultrasonic characteristics of the ultrasonic ground speedometer according to the invention, depending on the wavelength of the output ultrasonic wave. This ultrasonic characteristic test data is based on experimental data actually observed by the inventors.

Referring now to FIG. 2, a rough surface is indicated by a dotted line, while a smooth surface is indicated by a solid line. In the ultrasonic characteristic test for the ultrasonic ground speedometer of the invention, the rough surface was constructed by arranging vinyl chloride pipes having an outer diameter of 6 mm on a road surface at constant intervals, while the smooth surface was constructed by spreading sand over a road surface. In FIG. 2, the two S/N ratio characteristic curves were measured at a vehicle speed of 40 km/h on both smooth and rough surfaces, as previously described. In addition, the vehicle speed range was 0 to 200 km/h and the emitting angle $\theta$ of the output ultrasonic wave was set to 45°.

The aforementioned arranged pipe and sand surfaces are substantially similar to standard rough and smooth driving surfaces with regard to ultrasonic characteristics. This was assured by the inventors of the invention prior to the test.

As appreciated from FIG. 2, the observed S/N ratio of the Doppler shift signal is increased, as the output frequency $f_o$ becomes lower in such a manner as to be substantially close to 120 kHz (corresponding to a wavelength of 2.8 mm) and are decreased, as the output frequency $f_o$ becomes lower than substantially 120 kHz. When the output frequency $f_o$ becomes higher than 128 kHz (corresponding to a wavelength of 2.65 mm), the S/N ratio becomes extremely lowered. As the output frequency $f_o$ becomes lower than 100 kHz (corresponding to a wavelength of 3.4 mm), the S/N ratio becomes moderately lowered. Note that in the ultrasonic characteristic tests made on the respective smooth and rough surfaces, a high S/N ratio is gained in the vicinity of an output frequency of 120 kHz. When comparing test data gained at the respective smooth and rough surfaces, the ultrasonic characteristic curves of the S/N ratio gained in the rough surface test is slightly offset, from that of the smooth surface test, towards a longer wavelength, i.e., towards a lower output frequency (to the right, viewing FIG. 2). Naturally, the peak point of the S/N ratio gained on the rough surface is slightly offset from that of the smooth surface, also towards a longer wavelength. Actually, in the ultrasonic characteristic tests, the highest S/N ratio was gained at an output frequency of 120 kHz (essentially corresponding to a wavelength of 2.8 mm), utilizing the smooth surface. On the other hand, the highest S/N ratio was gained at an output frequency slightly lower than 120 kHz and higher than 100 kHz (essentially corresponding to a wavelength of 3.4 mm), for the rough surface. On the whole, for ultrasonic characteristic tests respectively utilizing both rough and smooth surfaces, essentially the same dependency on wavelength and output frequency is seen. Therefore, it is desirable that the output frequency range is selected from a frequency range exhibiting high S/N ratios as regards the Doppler shift signal.

As previously described, since in the ultrasonic characteristic tests shown in FIG. 2, the vehicle speed range is 0 to 200 km/h and the emitting angle $\theta$ is 45°, the Doppler shift $f_d$ may vary from 0 to 27.6 kHz. That is, the output frequency bandwidth is approximately 28 kHz. Therefore, an optimal output frequency range may be preferably set to a particular frequency range of 100 kHz (essentially corresponding to a wavelength of 3.4 mm) to 128 kHz (essentially corresponding to a wavelength of 2.65 mm) in accordance with the S/N ratio characteristic curve shown in FIG. 2. If the ultrasonic ground speedometer is installed on the vehicle in such a manner that the output ultrasonic wave is emitted in the vehicle forward direction, the Doppler frequency $f_d$ is varied between 0 (at the vehicle speed of 0) to 28 kHz (at the vehicle speed of 200 km/h). In order to keep the received ultrasonic wave frequency $(f_o + f_d)$ to substantially 128 kHz, the output frequency $f_o$ may be varied between 100 kHz to 128 kHz in response to change in the vehicle speed. On the other hand, if the ultrasonic ground speedometer is installed on the vehicle in such a manner that the output ultrasonic wave is emitted rearward of the vehicle direction, the Doppler frequency $f_d$ is varied between 0 (at the vehicle speed of 0) to $-28$ kHz (at the vehicle speed of 200 km/h). In order to keep the received ultrasonic wave frequency $(f_o + f_d)$ to substantially 100 kHz, the output frequency $f_o$ may also be varied between 100 kHz to 128 kHz in response to change in the vehicle speed.

As set forth above, when a resonance type microphone having a high Q factor is used as an ultrasonic receiver and an output frequency from an ultrasonic transmitter is varied in such a manner as to keep a received ultrasonic wave frequency of the receiver to a constant value corresponding to its resonance frequency, a high S/N ratio of the received ultrasonic wave signal, that is a high S/N ratio of the Doppler shift signal may be obtained. Additionally, if the varied output frequency is selected from an optimal frequency range exhibiting high S/N ratios for the Doppler shift signal on the basis of an experimentally observed S/N ratio characteristic curve, the highest S/N ratio for the Doppler shift signal may be obtained.

Although the aforementioned output frequency range of 100 to 128 kHz was determined under a particular test condition wherein a vehicle speed range is 0 to 200 km/h and an emitting angle is 45°, an optimal output frequency range may be determined n accordance with the previously described procedure, under any other test conditions.

While the foregoing is a description of the preferred embodiment for carrying out the invention, it will be understood that the invention is not limited to the particular embodiment shown and described herein, but may include variations and modifications without departing from the scope or spirit of this invention as described by the following claims.

What is claimed is:

1. An ultrasonic ground speedometer utilizing Doppler effect comprising:

ultrasonic transmitting means for outputting an ultrasonic wave at a predetermined angle against a road surface, ultrasonic receiving means for receiving a reflected ultrasonic wave caused by reflection of the output ultrasonic wave from the road surface;

arithmetic means for deriving ground speed from Doppler shift between the frequencies of the output ultrasonic wave from said ultrasonic transmitting means and the reflected ultrasonic wave received by said ultrasonic receiving means;

means for controlling the output ultrasonic wave frequency to keep the reflected ultrasonic wave frequency represented by the sum of the output ultrasonic wave frequency and the Doppler shift to a constant value in response to change in the ground speed derived by said arithmetic means;

wherein said ultrasonic receiving means includes a resonance type ultrasonic transducer having a resonance point in the vicinity of said reflected ultrasonic wave frequency, and wherein said ultrasonic transmitting means includes an ultrasonic transducer having a flat/sensitivity ultrasonic transducer having a flat frequency/sensitivity characteristic over a relatively wide frequency range obtained by subtracting and adding the Doppler shift from and to a resonance frequency of said ultrasonic receiving means.

2. The ultrasonic ground speedometer utilizing Doppler effect as set forth in claim 1, wherein said ultrasonic transducer comprises a piezoelectric transducer for converting acoustical signals to electric signals or vice versa.

3. An ultrasonic ground speedometer in accordance with claim 1, wherein said resonance type ultrasonic transducer of said ultrasonic receiving means has said resonance point thereof in the vicinity of said constant value of the reflected ultrasonic wave frequency, so as to filter ultrasonic wave frequency components other than said reflected ultrasonic wave frequency.

4. An ultrasonic ground speedometer in accordance with claim 1, wherein:

said resonance type ultrasonic transducer of said ultrasonic transmitting means exhibits a predetermined level of sensitivity within said relatively wide frequency range;

said resonance type ultrasonic transducer of said ultrasonic receiving means has said resonance point thereof in the vicinity of said constant value of the reflected ultrasonic wave frequency, so as to filter ultrasonic wave frequency components other than said constant frequency value; and said resonance point of said resonance type ultrasonic transducer of said ultrasonic receiving means is set in the vicinity of an uppermost ultrasonic wave frequency included in said frequency range of flat frequency/sensitivity characteristic of said ultrasonic transducer of said ultrasonic transmitting means when said output ultrasonic wave is emitted at said predetermined angle in a forward direction, and is set in the vicinity of a lowermost ultrasonic wave frequency included in said frequency range of flat frequency/sensitivity characteristic of said ultrasonic transducer of said ultrasonic transmitting means when said output ultrasonic wave is emitted at said predetermined angle in a rearward direction.

* * * * *